3,503,766
CYANAMIDE ADDITIVES FOR CEMENT
COMPOSITIONS
Francesco De Maria, Wilton, Conn., assignor to American Cyanamid Company, Stamford, Conn., a corporation of Maine
No Drawing. Continuation-in-part of application Ser. No. 365,496, May 6, 1964. This application Jan. 27, 1967, Ser. No. 612,093
Int. Cl. C04b 13/22, 13/26, 7/02
U.S. Cl. 106—89
9 Claims

ABSTRACT OF THE DISCLOSURE

Portland cement compositions exhibit increased strength when they contain from 0.5 to 15%, based on total weight, of an additive selected from the group: cyanamide, cyanamide dimer, alkali and alkaline earth metal salts of cyanamide dimer, and mixtures thereof.

---

This is a continuation-in-part of my U.S. application Ser. No. 365,496 filed May 6, 1964, now abandoned.

This invention relates to the use of select compounds as additives to cement compositions, or to other formulations, to impart strength and other desirable characteristics thereto, and relates also to compositions containing these additives. More particularly, this invention relates to the use of additives which may be incorporated directly into the cement or cement formulation by the manufacturer, distributor, or contractor, either alone or in combination with other compositions. The additives may also be used to impart strength to formulations such as clays, slips, glazes and the like.

By cement, as that term is employed herein, the term includes any one of the five major varieties of cement, as recognized in the United States. Type I or General-Use cement is normally for use in general concrete constructions, when the special properties specified for types II, III, IV, and V are not required. Type II or Moderate Heat-of-Hardening cement is normally for use in general concrete construction exposed to moderate sulfate action, or where moderate heat of hydration is required. Type III or High Early-Strength cement is for use when high early strength is required. Type IV or Low-Heat cement is normally for use when a low heat of hydration is required. Type V or Sulfate-Resisting cement is normally for use when high sulfate resistance is required.

The principal chemical and physical requirements of these cements are set forth in ASTM specification C-150-53.

The invention appears to be most useful in cement and cement formulations which, when set, form a paste, a mortar, or a concrete. The ultimate goal is in the preparation of cement mixtures, which when set, achieve high compressive strength and high flexural strength in the cured product. There are many factors which affect the characteristics of these cement formulations referred to above, such as water retention, rate of set (as a function of temperature), slump, plasticity, rate of cure (as a function of temperature), temperature resistance, terminal compressive strength, terminal tensile strength, water permeability, and shrinkage.

Heretofore, additives have been known to improve one or more of the properties of concrete, while ideally reducing the weight strength required for a given structure. Thus, typically calcium lignosulphates, a by-product of the paper pulp industry containing a certain amount of sugars or certain salts, have been employed.

Calcium lignosulphates are said to be set retarders and their use is said to increase the strength of the resulting concrete. Tests demonstrate that this additive is effective in increasing compressive strength for concrete of low cement content (concretes having compressive strengths less than 5,000 p.s.i.), but that the additive is detrimental for concrete of high cement contents which already have high compressive strength, i.e., 5,000 to 8,000 p.s.i. It is thus understandable why an additive of the type described cannot be widely employed in cement formulations for the purpose of improving concrete final set strengths.

An object of this invention is to provide a new group of additives and a method which result in a cement composition of enhanced set properties such as high flexural strength and high compressive strength, and improved freeze thaw resistance.

Another object is to provide a new group of additives which are of particular value in the production of concrete of high cement concentration, in situations where mixes of high compressive strength are desired.

A further object is to provide a new group of additives and a method for obtaining cement compositions having accelerated set time and which are lower caloric compositions.

These and other objects of this invention will become apparent to those skilled in the art as the description thereof proceeds.

In accordance with this invention, novel cement mixtures of formulations are provided by adding to cement a compound selected from the group consisting of cyanamide, cyanamide dimer such as dicyanamide, and metal salts of these compounds such as alkali metal and alkaline earth metal salts, e.g. sodium and calcium cyanamides, N-cyano-compounds and mixtures or any combination of one or more of these compounds or additives. It will be apparent that the additive may be added to cement or to cement formulations, or may in combination with other additives be added to cement or to cement formulations. In this connection, I have noted that the additive has a strengthening effect on the bulking agent, such as sand. By other additives, as that term is employed herein, conventional ingredients of cement formulations are included.

While the sand form of silica is the most common bulking agent used, any suitable bulking agent such as silica of other forms, diatomaceous earth, the various alkaline and alkali earth metal silicates, and aluminates or their equivalents may be employed for this invention.

The additive is incorporated with the cement in an amount sufficient to improve the strength characteristics of the cement paste, mortar, or concrete, but is governed by practical considerations such as maximum or minimal effects desired. As noted above, a cement paste includes merely cement and water, as the principal ingredient, whereas mortar additionally includes sand as a principal ingredient, and whereas concrete additionally includes sand and a coarse aggregate, as additional ingredients. For any one of these cement compositions, based upon the total weight after the incorporation and mixing of the principal ingredients including the additive, the practical working range of the additive of this invention normally ranges from about 0.5 to about 15% by weight. Within this range, the maximum benefits appear to be obtained from about 1% to about 5% of additive.

As noted above, it is within the scope of this invention to prepare the final product such as cement paste, mortar, or concrete by conventional methods and proportions as are recognized in the art, additionally utilizing the additives of this invention as an ingredient. It is also within the scope of this invention to use various time periods for curing, various relative humidities, and various temperatures, as would be convenient to the ordinary artisan.

However, I have determined that supperior products are obtained if desired by the process under particular conditions in which (1) the relative humidity varies from about 40% to about 95% in range, (2) the temperature for airing the mix varies from about 55° F. to about 75° F., the preferred range being from about 60° F. to about 65° F., for example as based on periods for curing the mix varying from about 7 days to about 28 days, for making test determinations. Within these ranges, uniformly superior results appear to be obtained at a relative humidity of about 95%, at a temperature of about 65° F. for example, based on test determinations performed after a curing period of (1) about 7 days for mortar preparations and (2) about 14 to about 28 days for concrete preparations. Such ideal conditions might be used for production of precast concrete products such as pipes, conduits, beams and columns. The above temperature ranges, however, are not to be interpreted to limit the scope of this invention, since it is common knowledge that contractors pour cement compositions in wide temperature ranges in any kind of weather.

Water is the diluent conventionally used in various cement formulations; however, non-aqueous diluents also may be used alone or with water in combination with the principal ingredients of the formulation to which are added the additives of this invention.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

In the subsequent Examples 1 to 7, Example 1 is directed to the evaluation of the effect of additive in cement pastes and Examples 2 through 6 are directed to the evaluation of the additive in mortar mixes. Example 7 is directed to the evaluation of the additive in concrete compositions.

The chemical analysis of the cement used in the tests of Examples 1 through 7 is: $SiO_2$—21.01%; $Al_2O_3$—5.62%; $Fe_2O_3$—2.66%; CaO (combined)—63.51%; MgO—2.90%; $SO_3$—2.36%; $Na_2O$—0.57%; $K_2O$—0.5%; ignition loss—0.65%; insoluble—0.22%.

EXAMPLE 1

Cement pastes

In order to demonstrate the effect of black calcium cyanamide ($CaCN_2$) on cement paste, for characteristics such as the time period required for the initial set, the time period required for the final set, quantity of water per unit weight of cement, and the normal consistency, tests were run using varying amounts of additive. The results are tabulated in Table I.

When preparing the test samples for the time of said studies of this example, all of the paste examples were adjusted to within the normal consistency specification of 9 mm. to 11 mm. (depth of penetration of a standard-sized needle in a standard time). The adjustment is accomplished by increasing or decreasing the water/cement ratio in the paste mix.

TABLE I

| Sample | Time to initial set, hrs.:min. | Time to final set, hrs.:min. | Cc. water, 500 g. cement | Normal consistency (mm). |
|---|---|---|---|---|
| Blank | 2:25 | 4:6 | 119 | 10 |
| 1% additive | 2:43 3:7 | 3:51 3:57 | 130 | 10 |
| 3% additive | 3:11 3:6 | 4:3 4:2 | 133 | 9½ |
| 5% additive | 3:25 3:42 | 4:33 4:42 | 143 | 11 |
| 10% additive | 3:10 3:19 | 3:56 4:5 | 152 (¹) | 9 |

¹ Specification 9–11 mm.

Table I demonstrates a series of rate of set tests of cement paste, comparing a standard control blank to which no additive was added, to other samples, to which 1%, 3%, 5%, and 10% of additive were added, respectively. The initial set time for mixtures containing the varying percentages of additive are greater than the corresponding initial set time for the control blank. Also, the cubic centimeters of water per 500 grams of cement is greater for the varying percentages of additive. The water retention characteristics of the mixture are better at percentages less than 5% of additive.

Mortar

For the mortar tests of Examples 2 through 6, standard graded silica sand, type C–109, from Ottawa, Ill., was used. The grading of this sand is given in Table II.

TABLE II

| Sieve size: | Percent passing |
|---|---|
| No. 30 | 99.6 |
| No. 50 | 24.6 |
| No. 100 | 1.4 |

Table II illustrates that (1) if the silica sand is graded through a screen of No. 30 mesh sieve size, 99.6% of the sand passes through the screen, (2) if the silica sand is graded through a screen of No. 50 mesh sieve size, 24.6% of the sand passes through the screen, and (3) if the silica sand is graded through a screen of No. 100 mesh sieve, 1.4% of the sand passes through the screen.

EXAMPLE 2

To demonstrate the individual and comparative effects of two different additives, a series of tests were run, using calcium cyanamide ($CaCN_2$) for certain tests and hydrogen cyanamide ($H_2CN_2$) for other tests. These tests were compared with a control blank of mortar which contained no additive. Using calcium cyanamide, separate tests were run using 2.5%, 5% and 7.5% of additive, respectively, based on the total weight of all ingredients after incorporation. For each of the percentages illustrated, test runs were performed, and for each, the tensile strength and compressive strength was determined, in pounds per square inch. The triplicate castings, performed for each percentage, were made and cured in a water-saturated-atmosphere for 11 days at 50° C.

TABLE III.—MORTAR

| Additive | Parts per weight of cement, percent | Average of 3 castings | |
|---|---|---|---|
| | | Tensile strength, p.s.i. | Compressive strength, p.s.i. |
| | | 183 | 2,450 |
| $CaCN_2$ | 2.5 | 183 | 2,450 |
| $CaCN_2$ | 5 | 198 | 2,600 |
| $CaCN_2$ | 7.5 | 214 | 2,850 |
| $H_2CN_2$ | 1.25 | 195 | 2,550 |
| $H_2CN_2$ | 2.50 | 218 | 2,650 |

In the Table III of Example 2, tensile strength and compressive strength obtained from various percentages of additive incorporated in mortar are compared to each other, and compared to a control blank. The additives used were calcium cyanamide for three demonstrations, and hydrogen cyanamide for two demonstrations.

The maximum improvement in strength for about 7.5% of calcium cyanamide, is about 16% improvement for both the tensile strength and the compressive strength. The free cyanamide (hydrogen cyanamide) has a greater effect on the tensile strength, as contracted to calcium cyanamide, and the free cyanamide has a comparable effect on the compressive strength, as contracted to calcium cyanamide.

EXAMPLE 3

To illustrate the effect of compressive strength of a broad percentage range the preferred additive, black calcium cyanamide, when tested after a 3 day cure and when tested after a 7 day cure, a series of tests of Example 3 were performed using wet curing conditions. Wet curing conditions are a relative humidity of about 95% and a temperature of about 65° F. The castings which included additive were compared to control blank castings which contained no additive.

The tests of this example were conducted by preparing standard 2 inch cubes with ingredients in the following proportions: Water—255 parts; cement—500 parts; sand—1375 parts. The results after 3 days of cure and after 7 days of cure, for various percentages of additives, are illustrated in Tables IV-A and IV-B.

TABLE IV-A

| Sample | Compressive strength for 3-day cure (p.s.i.) | Compressive strength for 7-day cure (p.s.i.) | (95% rel. humidity) curing conditions (° F.) |
|---|---|---|---|
| Blank | 2,180 | 3,100 | 65 |
| 1% additive | 2,010 | 3,310 | 65 |
| 3% additive | 2,220 | 3,970 | 65 |

TABLE IV-B

| Sample | Compressive strength for 3-day cure (p.s.i.) | Compressive strength for 7-day cure (p.s.i.) | (95% rel. humidity) curing conditions (° F.) |
|---|---|---|---|
| Blank | 2,320 | 3,770 | 65 |
| 5% additive | 2,530 | 4,920 | 65 |
| 10% additive | 2,650 | 4,780 | 65 |

In Tables IV-A and IV-B the compressive strength after 3 days of cure of mortars (1) containing no additive, (2) containing 1% additive, (3) containing 3% additive, (4) containing no additive, (5) containing 5% additive, and (6) containing 10% additive, are compared to the compressive strength of mortars after 7 days of cure, containing corresponding percentages of additive and cured under identical wet conditions. The significant increases in compressive strength were obtained using the 3% and 5% additive.

The precentage improvement in the compressive strength of the mortar casings containing the percentages of additive are contrasted to the control blank, after 3 days of cure. Similarly, the percentage improvement for the mortar castings containing additive were contrasted to the control blank after 7 days of cure. The percentage of improvement of the castings containing additive as contrasted to the control blank is illustrated in Table V, for test determinations after 3 days of cure and 7 days of cure.

TABLE V.—PERCENTAGE CHANGE IN EXAMPLE 3

|  | 3 day cure | 7 day cure |
|---|---|---|
| 1% additive | −7.8 | +6.5 |
| 3% additive | +1.8 | +28.0 |
| 5% additive | +9.1 | +30.3 |
| 10% additive | +14.2 | +26.8 |

Table V illustrates that the most unexpected and significant increases in compressive strength result from percentages of additive increased up to about 3% and to about 5%, when the additive is added to the mortar composition for test determinations both after the 3 days of cure and after the 7 days of cure at wet conditions.

EXAMPLE 4

To illustrate the effect of varying the curing conditions from the wet conditions to the dry conditions on the compressive strength of mortar compositions containing the more significant percentages of additives, a series of tests of Example 4 were performed. Under wet conditions, two series of tests were conducted for each of the control blank. The 3% additive—mortar, the 4% additive—mortar and 5% additive—mortar. For the dry conditions, a single series of tests were conducted in a similar manner. All the mortars were cured for 7 days prior to the test determinations. The results of these tests are illustrated in the table of Example 4.

TABLE VI

| | A | | B |
|---|---|---|---|
| | Compressive strength for 7 day cure, wet conditions, at 95% rel. humidity, 65° F. (p.s.i.) | | Compressive strength for 7 day cure, dry conditions, at 40% rel. humidity, 65° F. (p.s.i.) |
| Sample | (a) | (b) | |
| Blank | 3,365 | 3,185 | 2,495 |
| 3% additive | 3,455 | 3,615 | 2,651 |
| 4% additive | 3,730 | 3,690 | 2,720 |
| 5% additive | 3,750 | 3,885 | 2,600 |

The additive of Example 4 was calcium cyanamide the narrow percentage ranges of 3%, 4%, and 5% of additive for test determinations after 7 days of cure are compared in Example 4, as contrasted to the broad range comparison of Example 3. Also, Example 4, Table VI, illustrates the difference in compressive strength of mortar composition with and without additive, when cured under wet conditions as contrasted to when cured under dry conditions. The percentage improvement in the compressive strength for the particular percentages of additive-containing mortars as compared to the control blank of the respective test series, are illustrated in Table VII.

TABLE VII.—PERCENTAGE CHANGE IN EXAMPLE 4

| | A | | B |
|---|---|---|---|
| | (a) | (b) | |
| 3% additive | +2.7 | +10.3 | +6.8 |
| 4% additive | +10.2 | +15.9 | +9.4 |
| 5% additive | +10.3 | +21.9 | +4.6 |

The column under "A" corresponds to the series of tests under Example 4 performed under wet conditions. The column under "B" corresponds to the series of tests in Example 4, conducted under the dry conditions. The percentage increase in compressive strength for additive containing mortar cured for 7 days is a significant increase, when cured under either the wet conditions or the dry conditions.

EXAMPLE 5

Mortar compositions containing about 5% of additive give a more significant increase in compressive strength, than other percentages of additive. A series of tests of Example 5 were run comparing the compressive strength of four separate mortar mixes of identical cement contents, to which 5% additive had been incorporated, to four control blank mortar mixes containing no additive. The proportioning, the consistency, and the mixing of the mortars for these tests, conformed to the requirements specified in section seven of ASTM Standard C348 (test for flexural strength Hydraulic Cement Mortars (Tentative), 1961 Book of ASTM Standard, Part 4, p. 165) except that the flow was kept constant at 255 ml. (ASTM Standard C348 mix proportions correspond to those of section 7.8.4 of CSA Standard A5–1961). The results of these tests are illustrated in Table VIII.

TABLE VIII.—COMPRESSIVE STRENGTH FOR 7 DAY CURING TIME AT 95% RELATIVE HUMIDITY AND 65° F. (P.S.I.)

| Sample | I | II | III | IV |
|---|---|---|---|---|
| Blank | 3,360 | 3,370 | 3,400 | 3,400 |
| 5% additive | 3,750 | 3,930 | 3,700 | 4,060 |
| 5% additive | | 3,800 | 4,050 | 3,930 |

Example 5 demonstrates that 5% of black calcium cyanamide additive when added to mortar composition and when the composition is thereafter cured at 95% relative humidity and at 65° F., for example based on test determinations after 7 days of cure, produces significant increases in compressive strength. The compressive strength recorded above for each mix of the blank and of the 5% additive test, is an average of three to six single determinations for each respective mortar mix. Black calcium cyanamide additive in an amount of 5% of mortar mix produces an increase in compressive strength of about 15%. The percentage increase in compressive strength obtained from the individual additive mixes of Example 5, are illustrated in Table IX.

TABLE IX

Percentage increase in compressive strength

|   | Percent |
|---|---|
| I | +12 |
| II | +15 |
| III | +14 |
| IV | +18 |

A series of tests of Example 6 in which the mortar mixes were prepared under the same conditions as recited above, i.e. after 7 day cure at a relative humidity of 95% and at 65° F. were performed to determine the flexural strength of varying percentage additive-mortar mixtures comparing mortar mixtures cured under wet conditions to mortar mixtures cured under dry conditions, using black calcium cyanamide as the additive. In conducting the flexural strength test for the mortar preparations beam specimens of 1" x 1" x 10" were prepared and cured in the manner illustrated in Table X.

TABLE X.—FLEXURAL STRENGTH AT 7 DAY CURE

| Sample | Wet cure, 95% rel. humidity, 65° F. (p.s.i.) | Dry cure, 40% rel. humidity, 65° F (p.s.i.) |
|---|---|---|
| Blank | 510 | 505 |
| 3% additive | 595 | 415 |
| 4% additive | 540 | 425 |
| 5% additive | 565 | 425 |

Example 6 demonstrates that black calcium cyanamide added in an amount of 3%, 4% or 5% to a mortar mix which is subsequently cured under wet conditions, each produces a significant and unexpected increase in flexural strength as contrasted to a blank mortar mix which contains no additive.

EXAMPLE 7

Concrete preparations

In the concrete mixes used for the tests of Example 7, crushed limestone and natural sand were used as aggregates. The limestone, obtained from an Ottawa, Ontario quarry, is a dark, fine-graded, high calcium variety of limestone, typical of the local Trenton formation.

The aggregates for the Example 7 concrete mixes were screened into various size fractions, and then recombined according to Table XI.

TABLE XI

| Coarse aggregate | | Fine aggregate | |
|---|---|---|---|
| Sieve size | Percent passing | Sieve size | Percent passing |
| ¾ in | 100.0 | No. 4 | 100.0 |
| ½ in | 56.0 | No. 8 | 74.9 |
| ⅜ in | 37.5 | No. 16 | 61.9 |
| No. 4 | 0 | No. 30 | 45.5 |
|  |  | No. 50 | 19.5 |
|  |  | No. 100 | 3.6 |
|  |  | Pan | 0 |

Physical properties of the Example 7 crushed limestone and natural sand are given in Table XII.

TABLE XII

|  | Limestone | Natural sand |
|---|---|---|
| Specific gravity (bulk, saturated surface dry) | 2.71 | 2.68 |
| Absorption, percent (by weight) | 1.22 | 0.92 |
| Mix proportions, percent (by weight) | 52.0 | 48.0 |

The series of tests illustrated in Example 7 compared the flexural and compressive strength increases of concrete mixes containing 5% of black calcium cyanamide additive, to control blank concrete containing no additive. Three mixes were prepared and cured under wet conditions. The first mix was cured and tested after a cure of a period of 14 days, and the second after a cure of a period of 28 days.

In conducting the test of Example 7, standard beams and cylinders were prepared and cured for the particular curing periods as noted above. In the determination of the flexural strength tests made using the 1" x 1" x 10" beams as used in Example 6, the tests were considered to be not sufficiently reliable in view of the small beam size and in view of the impossibility of using tertiary point loading during the flexural strength test. Therefore, the tests were repeated on concrete specimens where the increased beam sizes permit use of the tertiary loading method. For the flexural strength test the particular size prepared from the concrete mix was 3½" x 4" x 16". The compressive strength tests on concrete were done on 4" x 8" cylinders. The control blank concrete mix of the following proportions was used: cement—35½ pounds; sand—112½ pounds; coarse aggregate—122.1 pounds of crushed limestone (¾" maximum); water—22.1 pounds. The control blank fresh mix had the following properties: (A) Slump test—2¼ inch; (B) unit weight—147.2 pounds per cubic foot; (C) entrapped air—2.2%; (D) 270 pounds water per cubic yard.

TABLE XIII

| Sample | 14 day cure | | 28 day cure | |
|---|---|---|---|---|
|  | Flexural strength | Compressive strength | Flexural strength | Compressive strength |
| Blank (p.s.i.) | 750 | 3,570 | 730 | 3,850 |
| 5% additive (p.s.i.) | 790 | 4,350 | 765 | 4,610 |
| Percent improvement in strength | +4 | +22 | +5 | +20 |

Table XIII of Example 7 illustrates the improvement in flexural and compressive strength when 5% of black calcium cyanamide additive is used in concrete preparation, for a 14 day cure and a 28 day cure under wet curing conditions. Table XIII of Example 7 illustrates that after 14 days of cure and after 28 days of cure, 5% additive gave a flexural strength increase of +4% and +5% respectively, and gave a compressive strength increase of +22% and +20% respectively, which are significant in unexpected, superior increases. The percentage increase can be expected to continue to increase as the time of cure increases.

A further series of tests and compositions are described in the following specific Examples 8 through 13.

In Examples 8-13, a number of experiments have been carried out to determine the effect of calcium cyanamide and hydrogen cyanamide on the properties of portland cement paste, mortar and particularly concrete. Both calcium and hydrogen cyanamide were examined initially by substituting 3, 5 and 8% of the Portland cement, and then by adding 1 or 2% of either form of cyanamide. The percentages of hydrogen cyanamide are always based on the solid content of the solution, whereby the excess water was taken into account by adjusting the gauging water.

In the Examples 8-13, the following materials were used for the above experiments:
(1) Aero Calcium Cyanamid, special, fine, hydrated (black powder).[1]
(2) Aero Cyanamid-50 (Hydrogen Cyanamide Solution).[1]
(3) Type I Portland Cement, St. Mary's Cement and Canada Cement Co.
(4) Graded Standard Ottawa Sand, ASTM C-109.
(5) Concrete Sand, ASTM C-33 (Fine Aggregate).
(6) ⁵⁄₁₆"–½" Tumbled Limestone (Coarse Aggregate).
The following standard test procedures were used:
(1) Normal Consistency, ASTM C187-64.
(2) Vicat Set Time, ASTM C191-58.

---
[1] Supplied by Cyanamid of Canada Ltd.

(3) Compressive Strength of Mortars, ASTM C109-64.
(4) Slump Test, ASTM C143-53.
(5) Compressive Strength of Concrete, ASTM C192-65 and ASTM C38-64 using 3" x 6" cylinders.
(6) Proctor Penetration Set Time, ASTM C403-65T.
(7) Air Content of Freshly Mixed Concrete, ASTM C231-62.
(8) Temperature Set Time, ASTM C472-66.
(9) Freeze-Thaw, ASTM C291-61T.

EXAMPLE 8

Portland cement pastes

In this example, the water requirements and Vicat set times of plain pastes and pastes containing 3, 5 and 8% calcium or hydrogen cyanamide were determined according to ASTM C187 and ASTM C191. Only water and cement are mixed for pastes. The water is added until a standard paste thickness as measured by a Vicat needle is obtained. The results given in Table XIV show that calcium cyanamide retards the time of set slightly. However, a considerble acceleration of the set time was observed with hydrogen cyanamide. When 5 and 8% portland cement was substituted by hydrogen cyanamide the required set time minimum of 45 minutes was not obtained. In both cases an appreciable temperature rise was noticed, which is probably due to the rapid hydration of the portland cement, rather than to a reaction between hydrogen cyanamide and for example free lime present in the portland cement.

TABLE XIV.—CONSISTENCY AND VICAT SET TIMES OF PASTES

| Percent additives | Water/solid ratio for standard consistency | Vicat set time,* hrs./min. |
|---|---|---|
| None | 0.252 | 2:38 |
| 3% CaNCN | 0.258 | 3:02 |
| 5% CaNCN | 0.262 | 4:23 |
| 8% CaNCN | 0.266 | 4:09 |
| 3% H₂NCN | 0.204 | 0:53 |
| 5% H₂NCN | 0.190 | 0:30 |
| 8% H₂NCN | 0.164 | 0:15 |

*St. Mary's Cement Co. Type I Portland Cement.

EXAMPLE 9

In order to compare the accelerating effect of hydrogen cyanamide with that of $CaCl_2$ a series of experiments was carried out. It was found that the same degree of acceleration is obtained by 2% hydrogen cyanamide and 3.5% $CaCl_2$. The results are shown in Table XV.

TABLE XV.—EFFECT OF HYDROGEN CYANAMIDE AND CALCIUM CHLORIDE ON THE VICAT SET TIME OF PASTES

| Type and percent of additive | Vicat set time, hrs./min. | Temperature rise set time,* hrs./min. |
|---|---|---|
| None | 3:00 | 6:40 |
| 2% H₂NCN | 0:35 | 1:15 |
| 2% CaCl₂ | 1:20 | 3:50 |
| 3.7% CaCl₂ | 0:30 | |

*Canada Cement Co. Type I Portland Cement.

EXAMPLE 10

Portland cement mortar

In this example, the water requirements for a plain mortar, and for mortars containing 1, 2, 3, 5 and 8% calcium cyanamide and 1, 2 and 3% hydrogen cyanamide to give a flow value of 100–115 were determined. In mortars, sand is also added to the mix in the ratio of 1 part cement to 2.75 parts sand. Water is then added to give the standard consistency as stated. Twelve 2" cubes made from each mix according to ASTM C109 and three cubes of each mix were broken at the 1, 3, 7, and 28 days. The cubes were stored, immersed in water until the appropriate age. The results are shown in Table XVI.

TABLE XVI.—COMPRESSIVE STRENGTH OF MORTARS

| Percent[1] additives | Water/solids ratio required to give 100–115 flow | Compressive strength [2] (p.s.i.) | | | |
|---|---|---|---|---|---|
| | | 1 day | 3 days | 7 days | 28 days |
| None | 0.480 | 1,350 | 2,250 | 3,030 | 4,110 |
| 3% CaNCN | 0.494 | 1,110 | 2,250 | 2,790 | 4,150 |
| 5% CaNCN | 0.494 | 900 | 1,930 | 2,530 | 3,680 |
| 8% CaNCN | 0.497 | 950 | 2,080 | 2,840 | |
| 3% H₂NCN | 0.444 | 810 | 2,220 | 2,760 | 4,470 |
| 1% CaNCN | 0.488 | 970 | 2,130 | 3,480 | 4,650 |
| 2% CaNCN | 0.492 | 1,230 | 2,150 | 2,900 | 4,330 |
| 1% H₂NCN | 0.466 | 1,630 | 2,790 | 3,570 | 5,220 |
| 2% H₂NCN | 0.454 | 1,440 | 3,090 | 3,780 | 5,240 |

St. Lawrence Cement Co. Type I Portland Cement.
[1] 1 and 2% added to the Portland Cement; 3, 5 and 8% substituting Portland Cement.
[2] Average of 3 specimens.

EXAMPLE 11

Slump and compressive strength of portland cement concrete

In this example, the water requirements for the plain mix and mixes containing 1, 2, 3, 5 and 8% calcium cyanamide and 1, 2 and 3% hydrogen cyanamide to give a 2" slump were determined using ASTM C143. A dry mix of 100:216:317 parts by weight of cement:sand:limestone was used exclusively.

Twelve 3" x 6" concrete cylinders prepared from these mixes and three cylinders from each mix were capped and broken at 1, 3, 7, and 28 days. The cylinders were stored at 95% relative humidity to the required age.

The results shown in Tables XVII, XVIII and XIX indicate that both forms of cyanamide increase the compressive strength of concrete. For hydrogen cyanamide the increase is noticeable at practically all strength levels, i.e. even in cases where further increases in the cement concentration no longer produce an increase in strength, as in Table XIX.

As it is well known, the strength of concrete can be increased by adding more cement, but up to a limit after which there is no further increase in strength with addition of concrete. Moreover, at high cement/aggregate ratios, shrinkage also becomes a problem. Table XX shows that with the addition of hydrogen cyanamide it is possible to continue the addition of cement, and obtain a strength increase, beyond the limit point without the cyanamide.

TABLE XVII.—COMPRESSIVE STRENGTH OF CONCRETE

| Percent[1] additives | Water/solids ratio required to give a 2" slump | Compressive strength [2] (p.s.i.) | | | |
|---|---|---|---|---|---|
| | | 1 day | 3 days | 7 days | 28 days |
| None | 0.480 | 1,510 | 2,100 | 2,500 | 3,390 |
| 3% CaNCN | 0.484 | 1,310 | 2,100 | 2,570 | 3,820 |
| 5% CaNCN | 0.495 | 1,240 | 2,440 | 2,760 | 3,850 |
| 8% CaNCN | 0.497 | 1,460 | 1,950 | 2,620 | 4,070 |
| 3% H₂NCN | 0.443 | 1,200 | 1,990 | 2,720 | 4,680 |

St. Mary's Cement Co. Type I Portland Cement.
[1] Substituting Portland Cement.
[2] Values are an average of three cylinders.

TABLE XVIII.—COMPRESSIVE STRENGTH OF CONCRETE

| Percent[1] additives | Water/solids ratio required to give a 2" slump | Slump in. | Compressive strength [2] (p.s.i.) | | | |
|---|---|---|---|---|---|---|
| | | | 1 day | 3 days | 7 days | 28 days |
| None | 0.511 | 2¼ | 1,775 | 2,315 | 3,420 | 4,010 |
| 1% CaNCN | 0.511 | 2 | 1,710 | 2,550 | 3,470 | 4,335+8.6 |
| 2% CaNCN | 0.511 | 2¼ | 1,565 | 3,150 | 3,570 | 4,590+14.1 |
| 1% HNCN | 0.511 | 5½ | 1,425 | 2,950 | 3,975 | 4,710+17 |
| 2% HNCN | 0.511 | 7½ | 1,265 | 2,905 | 4,000 | 5,040+26 |

Canada Cement Co. Type I Portland Cement.
[1] Added to Portland Cement.
[2] Values are an average of three cylinders.

TABLE XIX

| Percent [1] additives | Cement: aggregate ratio | Compressive strength [2] (p.s.i., average of 3 tests) | | | |
|---|---|---|---|---|---|
| | | 7 days | | 28 days | |
| | | Control | 2% $H_2NCN$ added | Control | 2% $N_2HCH$ added |
| 2% $H_2NCN$ | 0.19 | 3,655 | 4,295 | 4,270 | 5,190 |
| 2% $H_2NCN$ | 0.30 | 4,120 | 5,810 | 4,770 | 6,600 |
| 2% $H_2NCN$ | 0.50 | 4,520 | 5,950 | 4,820 | 7,000 |

Canada Cement Co. Type I Portland Cement.
[1] Added to Portland Cement.
[2] Values are an average of three cylinders.

EXAMPLE 12

In this example, the air content of freshly mixed concrete containing 3, 5 and 8% calcium cyanamide and 3% hydrogen cyanamide was determined according to ASTM C231 using a Press-Ur-Meter. The concrete was made with the dry mix of Example 11.

The results shown in Table XX show that cyanamides do not entrain air.

TABLE XX

Air content of concrete

| Percent additives: | Percent air content |
|---|---|
| None | 2.75 |
| 3% CaNCN | 2.10 |
| 5% CaNCN | 2.10 |
| 8% CaNCN | 2.15 |
| 3% $H_2NCN$ | 3.05 |

EXAMPLE 13

In this example, experiments were conducted to determine the effect on the compressive strength of concrete under freeze thaw conditions when the concrete incorporated calcium and hydrogen cyanamides as additives.

The dry mix for the concrete was the same as that of Example 11.

The results of freeze-thaw experiments indicate that the hair-cracks which are present in plain concrete samples after 80 cycles of freezing and thawing are not present in samples containing either calcium or hydrogen cyanamide. Similarly the reduction in compressive strength due to freeze-thaw is greater for the plain concrete than for concrete containing cyanamide.

The results are given in Table XXI.

TABLE XXI.—EFFECT OF FREEZE-THAW ON THE COMPRESSIVE STRENGTH OF CONCRETE (P.S.I.)

| Additive | Before freeze-thaw | After freeze-thaw |
|---|---|---|
| None | 5,180 | 4,260 |
| 2% CaNCN | 5,570 | 5,180 |
| 2% $H_2NCN$ | 5,870 | 5,540 |

The additives of this invention, in the preferred embodiments, specifically include cyanamide, sometimes called hydrogen cyanamide, dicyandiamide, and calcium cyanamide, especially the black calcium cyanamide. Each of these materials separately or in admixture renders unexpected improvements in tensile and compressive strength, specific gravity and temperature resistance, for example. It has been seen that the addition of 3% to 5% of crude calcium cyanamide, better known as black calcium cyanamide, to cement renders concrete with 20% higher compressive strength than is obtained without the calcium cyanamide additive. Hydrogen cyanamide is effective in slightly less amounts. The advantages to be obtained by the use of any one or more of these additives is dependent upon such variables as percent additive, composition of additive (i.e. calcium to free cyanamide ratio), and the proportion of cement in the mix. These factors would affect properties such as plasticity, rate of set, rate of cure, water retention, temperature of resistance, terminal compressive strength, terminal tensile strength, water permeability, and shrinkage, for example. When black calcium cyanamide is utilized as the additive, there is present (to one degree or another) calcium oxide. An excess of calcium oxide in cement compositions such as concrete, has a detrimental effect upon the concrete composition. Thus, the presence of calcium oxide in the additive could prevent the additive from being as effective as it might otherwise be. To prevent such a possibility, use of hydrogen cyanamide in minor percentage (less than 50%) with black calcium cyanamide, is a preferred embodiment of this invention. The calcium free cyanamide ratio can be changed to maximize or minimize certain properties of the additive. The black calcium cyanamide as well as other additives of this invention are of advantage in aqueous and non-aqueous solutions, as an additive for cement. The setting time test, using black calcium cyanamide, shows that the additive has an advantageous effect on the water requirement of the mix.

When an artisan wishes to increase the compressive strength of a high compressive strength concrete for example, because the concrete composition already has the maximum amount of cement present in the composition, additional compressive strength cannot be obtained by the addition of more cement. Thus, there is no other apparent way to increase the compressive strength of these high compressive concrete compositions except by the use of additives such as the additives of this invention. These additives are therefore important in producing the desired weight/strength ratio as required in a given structure. Also, as an alternative to adding additional cement in the cement compositions of lower cement concentration and of lower compressive strength, additive may be used. The saving in cement per cubic yard is about 35 pounds of cement for concrete containing 480 pounds of cement per cubic yard; i.e., 445 pounds of cement to be used with additive is equivalent to 480 pounds of cement to be used without additive, per cubic yard of concrete. This means 24 pounds of additive per cubic yard of cement would replace 35 pounds of cement per cubic yard and maintain essentially the same compressive strength. This saving is of obvious economic benefit to those involved in the construction work.

When pure cyanamide (known as hydrogen cyanamide) is utilized as the additive, it preferably would be utilized in the form of a hydrogen cyanamide solution of about 50%, to give superior results. This would be a preferred process embodiment of this invention. The hydrogen cyanamide does not contain lime, calcium, or carbon which when present above certain percentages are deleterious to the properties of cement compositions such as concrete. The liquid preferably is added to the water, to insure good dispersion throughout the concrete.

The results illustrated in the examples indicate conclusively that cyanamide (particularly in the hydrogen form) is capable of improving the properties of portland cement concrete to a considerable extent. With additions of cyanamide it is possible to increase the compressive strength of concrete even at high levels of cement concentrations where further increases in cement are not effective or cannot be tolerated because of shrinkage etc.

The increase in strength is due to a direct effect on the constituents of portland cement, and is not due to the reduction in water requirement formed with hydrogen cyanamide. However, this ability to reduce the water requirement should be useful wherever the water/solid ratio of the concrete is critical and air entraining is undesirable, i.e. prestressed concrete, concrete pipes, construction of dams etc.

Hydrogen cyanamide has also been found to accelerate the time of set of concrete more efficiently than calcium chloride. Since there are many applications where corrosion due to chlorides in the concrete cannot be tolerated, it is obvious that hydrogen cyanamide could be used as a replacement for calcium chloride, e.g. in many types of winter construction, manufacture of precast concrete blocks etc.

One of the most interesting observations about hydrogen cyanamide is the fact that it increases the freeze-thaw resistance of concrete. At the present time only air entrainment has been used for this purpose with some measure of success. However, air entrainment always decreases the strength of the concrete and air entraining agents are quite sensitive in their effectiveness to changes in the concrete composition, mixing time, temperature etc. It appears that hydrogen cyanamide is unique in so far as it represents a new type of material to improve the freeze-thaw resistance of concrete by a change in the basic properties of the cementitious phase in the concrete.

Other suitable changes and variations may be made in the carrying out of the invention as disclosed herein without departing from the spirit and scope thereof, as defined in the appended claims.

I claim:

1. A cement composition comprising portland cement and from 0.5 to about 15% of the total composition of an additive which improves the set characteristics of said cement composition when admixed with an aqueous diluent, said additive being selected from the group consisting of cyanamide, cyanamide dimer, alkali and alkaline earth metal salts of cyanamide dimer, and mixtures thereof.

2. A composition according to claim 1 in which said additive comprises hydrogen cyanamide.

3. A composition according to claim 1 in which said additive comprises calcium cyanamide.

4. A cement paste comprising the composition of claim 1 and an aqueous diluent.

5. A cement composition comprising the composition of claim 1, and bulking agent selected from the group consisting of sand, diatomaceous earth, and coarse aggregate.

6. A composition comprising the composition of claim 5 wherein said bulking agent is sand, and water.

7. A concrete composition comprising the composition of claim 1, sand and a coarse aggregate.

8. A composition comprising the composition of claim 7 and water.

9. A method for forming a cast solid product which comprises admixing the composition of claim 1 with an aqueous diluent and curing at a relative humidity ranging from about 40% to about 95% and at a temperature of from about 55° F. to about 75° F.

No references cited.

TOBIAS E. LEVOW, Primary Examiner

W. T. SCOTT, Assistant Examiner

U.S. Cl. X.R.

106—90, 97, 315

PO-1050
(5/69)

UNITED STATES PATENT OFFICE
CERTIFICATE OF CORRECTION

Patent No. 3503766                    Dated March 31, 1970

Inventor(s) Francesco DeMaria

It is certified that error appears in the above-identified patent and that said Letters Patent are hereby corrected as shown below:

Column 4, Line 64 "contracted" should read -- contrasted --.

Column 4, Line 66 "contracted" should read -- contrasted --.

Column 9, Line 4 "ASTM C38-64" should read -- ASTM C39-64 --.

Column 5, Line 40 "casings" should read -- castings --.

SIGNED AND SEALED
SEP 15 1970

(SEAL)
Attest:

Edward M. Fletcher, Jr.
Attesting Officer

WILLIAM E. SCHUYLER, JR.
Commissioner of Patents